S. C. WRIHGT.
Lathe Clutch.
No. 63,977. Patented April 16, 1867.
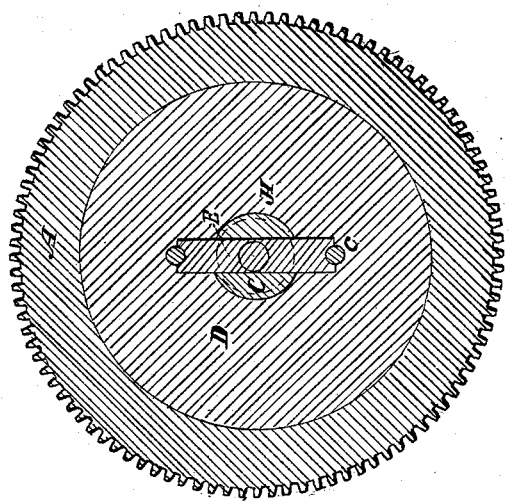
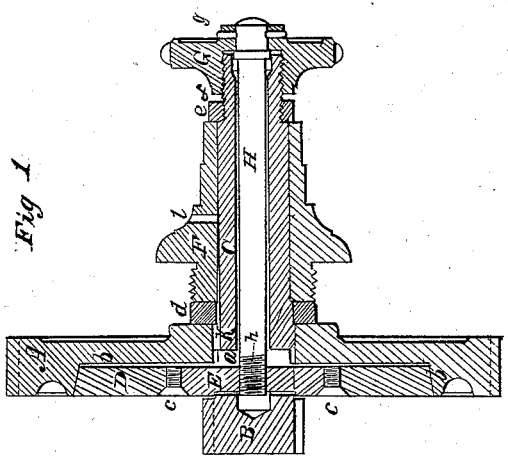
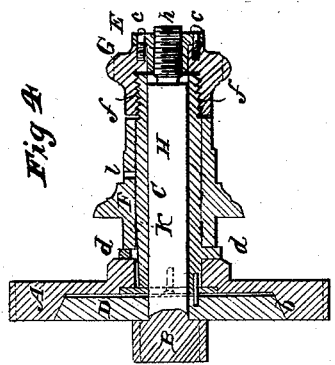
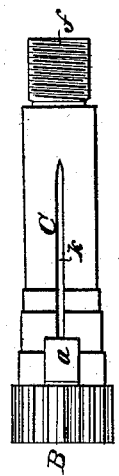
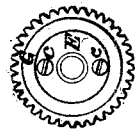
WITNESSES:
INVENTOR:
S C Wright
by his attorney

United States Patent Office

SYLVESTER C. WRIGHT, OF FITCHBURG, MASSACHUSETTS.

Letters Patent No. 63,977, dated April 16, 1867.

---

IMPROVED FRICTION CLUTCH.

---

The Schedule referred to in these Letters Patent and making part of the same.

---

TO ALL PERSONS TO WHOM THESE PRESENTS SHALL COME:

Be it known that I, SYLVESTER C. WRIGHT, of Fitchburg, in the county of Worcester, and State of Massachusetts, have invented an Improved Friction Clutch operative mechanism for engine lathes or various other machinery; and I do hereby declare the same to be fully described in the following specification and represented in the accompanying drawings, of which—

Figure 1 denotes a longitudinal section of it.

Figure 2 is a transverse section taken through the clutch.

Figure 3 is a side view of the shaft carrying the smaller gear or pinion B, to be hereinafter described.

In such drawings, A and B denote two gears provided with the friction clutch and its operative mechanism, to be hereinafter described, the purpose of such clutch being to enable one gear to revolve independently of the other, or to put it in revolution, as circumstances may require. The pinion or gear B is fixed to the end of a tubular arbor or shaft, C, which has a hole or passage, $a$, made through it transversely and close to the said gear B. The larger gear A revolves loosely on the shaft C, and has a conical socket or recess, $b$, made in that side of it which is next to the pinion B, such socket being for reception of a conical clutch plate, D, arranged on the shaft, and so applied to it as to be revolved with and by it and yet be able to be slid or moved on such shaft a short distance lengthwise of it. To this end a bar, E, connected at its extremities to the clutch plate by screws, $c$ $c$, and inserted within the clutch plate, goes diametrically through the aperture $a$ of the shaft C, such aperture being of a width in the direction of the axis of the shaft sufficient to enable the cross-bar E to slide or move in such direction the distance required for effecting the desirable movements of the clutch plate D with respect to the gear A; in other words, to enable the clutch plate to be drawn closely into the socket $b$, or moved out of contact with the gear A, in order to clutch the said gear A to the shaft C or unclutch it therefrom, as circumstances may require. The shaft C is supported in a bearing or nut, F, which screws into the poppet, or that part of the lathe frame destined for its support, the shaft being held in place in the bearing by a collar, $d$, fixed on the shaft, and by a nut, $e$, screwed upon a left-hand screw, $f$, cut on the shaft or arranged on it as represented. A hand-nut, G, having a rod, H, extending from it into the bore of the shaft C is screwed upon the screw $f$, the rod being fixed to the hand-nut by means of a pin, $g$, which goes transversely through the nut and the rod. Furthermore, on the inner end of the rod H a "right-hand screw," $h$, is cut, it being screwed into the cross-bar E of the clutch plate. By revolving the hand-nut in one direction, that is, such that if continued would unscrew the nut from the screw $f$, the clutch plate D will be drawn up to the wheel A. At the same time the screw $h$ will be screwed into the bar E, and will thereby aid in drawing the clutch plate up to the gear A. A reverse motion of the nut G and the rod H will cause, by the joint action of the screws $f$ and $h$, the clutch plate to move away from the gear A. The plate D at its periphery is to be drawn against that of the recess for its reception, so as by the friction of the surfaces in contact the plate and wheel are to be connected in a manner to cause the wheel A while revolving to revolve the shaft C and its pinion B. In a lathe the pinion B may be supposed to be a part of the mechanism for effecting what is termed the feed of the tool. A groove, $k$, is formed longitudinally in the shaft C, and leads into the aperture $a$. A small hole, $l$, is made vertically through the bearing F. When oil is poured into this hole, it will find its way into the groove $k$, through which it will run into the aperture $a$, and from thence between the clutch plate D and the shaft C, and thus lubricate their surfaces in contact as well as those of the shaft C and bearing F.

Figure 4 is a vertical section, exhibiting another arrangement or mode in which I have contemplated the application of my invention.

In this last-mentioned figure the pinion and the clutch plate are represented as attached to the shaft or rod H, and the male screw $h$ is also exhibited as formed on the shaft H near its outer end, instead of being at its inner end as shown in fig. 1. The part or nut E carrying the female screw of the screw $h$, instead of being affixed to the clutch plate, as shown in fig. 1, is secured directly to the nut G by screws $c$ $c$, an end view of the said part E and the nut G being represented in Figure 5. The advantage of this last-described arrangement of the screw $h$ and nut E is that it renders unnecessary the making the shaft C with the lateral opening $a$ to receive the nut E, and, furthermore, it enables the parts to be detached with greater facility.

I am aware of the invention described in the United States Patent No. 39,326, dated July 21, A. D. 1863, and granted to the Putnam Machine Company. Therefore I make no claim thereto. I employ no swivel nor union-jointed nut as used in such invention for effecting the movements of the clutch, but, and in combination with the nut G and its male screw $f$, applied to the parts C and H, auxiliary male and female screws, viz, the screw $h$ and its female screw in the bar or nut E, having their threads pitched in a direction opposite to those of the said auxiliary screws, operating conjointly with the main screws in effecting a movement of the clutch plate D, whether toward or away from the gear A.

What, therefore, I claim as my invention for effecting the movements of the clutch plate D, is—

The combination of the auxiliary male screw $h$, and its bar or nut E, with the nut G, and its male screw $f$, having their threads pitched in opposite directions to those of the screw $h$ and nut E, the whole being applied substantially as explained to the parts or shafts C and H, projecting from the gears A B and the clutch D, as set forth.

I also claim the arrangement of the auxiliary nut E and its screw $h$ at either end of the shaft H, as hereinbefore set forth, when combined with plate D, tube $c$, and nut G.

I also claim the combination as well as the arrangement of the oil passages $k$ $l$ with the bearing F, the shaft C, and the clutch plate D applied to the shaft, by means substantially as specified.

SYLVESTER C. WRIGHT.

Witnesses:
JAMES L. CHAPMAN,
CALVIN WALLACE.